United States Patent [19]

Männl

[11] Patent Number: 4,981,505

[45] Date of Patent: Jan. 1, 1991

[54] APPARATUS FOR HEAT-SEALING A GLASS CONTAINER

[75] Inventor: Reinhard Männl, Mitterteich, Fed. Rep. of Germany

[73] Assignee: Schott-Ruhrglas GmbH, Bayreuth, Fed. Rep. of Germany

[21] Appl. No.: 331,284

[22] Filed: Mar. 31, 1989

[30] Foreign Application Priority Data

Mar. 31, 1988 [DE] Fed. Rep. of Germany ....... 3810940

[51] Int. Cl.$^5$ ............................................ C03B 23/057
[52] U.S. Cl. ....................................... 65/152; 65/272; 65/283
[58] Field of Search ................. 65/152, 268, 272, 283, 65/270; 53/285

[56] References Cited

U.S. PATENT DOCUMENTS

| | | | |
|---|---|---|---|
| 1,832,039 | 11/1931 | Millar | 65/152 |
| 3,003,285 | 10/1961 | Sickel | 65/283 |
| 3,105,753 | 10/1963 | Ashford | 65/283 |
| 3,434,818 | 3/1969 | Chauvin | 65/152 |
| 3,556,760 | 1/1971 | Bender et al. | 65/283 |

*Primary Examiner*—Joye L. Woodard
*Attorney, Agent, or Firm*—Millen, White & Zelano, P.C.

[57] ABSTRACT

A heat-sealable glass container is heat-sealed by an apparatus which heats the container with an infrared lamp while rotating the container and elongating the heat-softened top portion. The elongation of the softened glass pulls the glass to a point and results in an airtight seal.

9 Claims, 2 Drawing Sheets

APPARATUS FOR HEAT-SEALING A GLASS CONTAINER

CROSS-REFERENCE TO RELATED APPLICATIONS

This application is related to a concurrently filed application entitled "Heat-Sealable Glass Container", based on German priority document No. P 38 10 939.5, and having U.S. patent application Ser. No. 07/331,321, filed Mar. 31, 1989, which is incorporated by reference herein.

BACKGROUND OF THE INVENTION

This invention relates generally to an apparatus and process for sealing a container and, more particularly, to an apparatus and process to heat-seal a glass container having an open top-end portion formed of glass which absorbs radiation in the infrared region of the spectrum. The glass containers preferably have a breakaway area which can readily be broken to open the container without breaking the remainder of the container. The breakaway area is generally spaced sufficiently far from the heat-sealable area to avoid any substantial thermal dissipation of the mechanical stresses in the glass which serve to weaken the glass in the breakaway area.

Glass containers are desirably used to transport biological materials, e.g., tissue samples and blood samples, to laboratories for testing. There is, of course, the danger that some of the biological material will be accidentally spilled, resulting in pollution of the environment and/or endangering personnel. To minimize the risk of the escape of biological materials, it is desirable that the glass containers in which they are stored be capable of being hermetically heat-sealed, i.e., melted shut. However, in most applications, the heat-sealing of glass containers for biological materials has been impractical for a number of reasons. One reason was that the staff in physicians' offices and medical clinics were not in general sufficiently familiar with the heat-sealing techniques. Consequently, the results achieved would depend in large measure on the skill of the operators. Also, the high temperature needed to heat-seal conventional glass containers often results in damage to or destruction of the biological materials in the container. Additionally, the sealing with a burner by unskilled persons often results in nonuniform containers. This makes it difficult to pack the containers for transport. More importantly, when the heat treatment does not result in a perfect hermetic closure of the container, contagious biological materials may escape and pose a danger to personnel.

SUMMARY OF THE INVENTION

It is therefore an object of the present invention to provide an apparatus and process for heat-sealing glass containers of biological materials which consistently form a hermetic seal without damaging the biological material in the container.

It is an object of the invention to provide an apparatus which provides a heat-sealed glass container of uniform dimension, regardless of the skill of the operator.

Upon further study of the specification and appended claims, further objects and advantages of the invention will become apparent to those skilled in the art.

These objects are attained according to the invention by the use of an apparatus having a first rotatable clamping means to hold the closed bottom-end of the glass container to be heat-sealed, a second rotatable clamping means to hold the open top end, a heating means arranged to heat the top-end portion of the container, and a drawing means to elongate and reduce the diameter of the heated top end until it melts closed and forms a tip.

More comprehensive embodiments of the invention include one or more of the additional features, as described hereinafter, for example:

a motor means to synchronously rotate the first and second rotatable clamping means and, preferably manually, a engageable control means programmed to automatically control the rotation of the first and second rotatable clamping means, the operation of the heating means and the rate of travel of the drawing means.

With the apparatus of this invention, all that is required is to place the container of biological material in the first and second rotatable clamping means and actuate the control device. The heat-sealing process is then automatically performed in a uniform fashion so that the skill of the operator is of no importance. Uniformly sealed glass containers are consistently obtained with this apparatus.

The process of the present invention is used to heat-seal glass containers having an open-end portion formed of an infrared-absorbing glass with an absorbance of at least 10 cm$^{-1}$. This process comprises rotating the container while the open-end portion is heated, preferably by an infrared lamp. When the heated portion of the container becomes softened, the softened portion is drawn to elongate and reduce the diameter of the end portion until it melts closed.

BRIEF DESCRIPTION OF THE DRAWINGS

The invention and further details of the invention will become more apparent from the preferred embodiments presented hereinafter and illustrated in the drawings.

In FIG. 2, the parts which correspond to those used in the apparatus shown in FIG. 1 are designated with the same reference numerals as in FIG. 1, except they are prefixed with the numeral "2." To avoid repetition, reference is made to the description of the common components as used in FIG. 1.

DETAILED DESCRIPTION OF THE DRAWINGS

Figure 1:
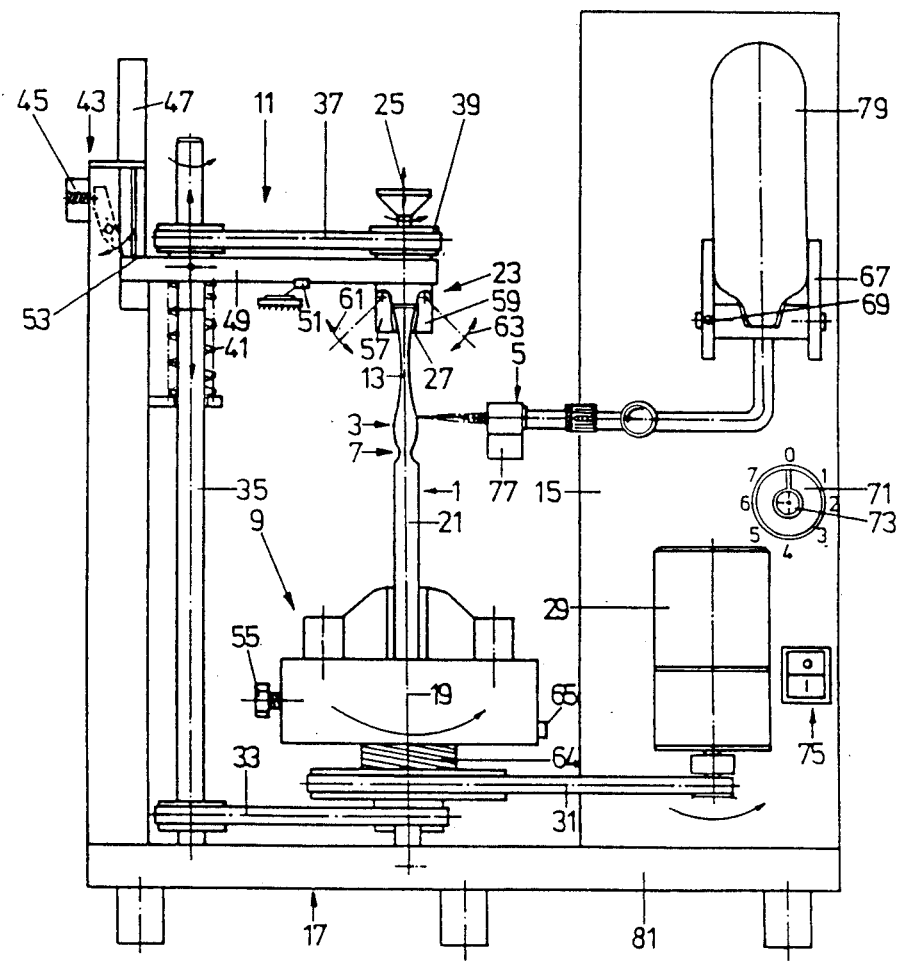
FIG. 1 is a side view of one embodiment of the apparatus of the invention showing a glass container being heat-sealed and the apparatus according to the invention.

FIG. 1 shows an apparatus 17 for hermetically sealing a medical sample container 1 used in medical or clinical practice. The open-end portion 3 of container 1 is heat-sealed by means of a heating device 5. Preferably, a breakaway area is provided on the container to facilitate opening of the container. The breakaway area is sufficiently removed from the heat sealable area 3 to avoid, during the heat-sealing operation, the thermal dissipation of mechanical stresses in the breakaway area 7. Apparatus 17 which easily can be operated in a medical office or clinical facility includes a first rotatable clamping means or holder 9 into which can be secured a sample container 1; a heating means 5 positioned to apply heat to the top-end portion of container 1; a drawing means 11 for drawing and elongating to a tip 13 the heat-softened portion of container 1; and a manually actuated control means 15 which is programmed to automatically control the rotation of the first and second rotatable clamping means 9 and 23, respectively, the heating means 5, and the drawing means 11.

The holder 9 with the sample container 1 clamped therein can be rotated about an axis of rotation 19, which essentially coincides with the axis 21 of the sample container 1. The drawing means 11 controls the travel of a second rotatable clamping means 23 in a direction essentially along the axis 21 of sample container 1. In operation, the second rotatable clamping means 23 with the top-end portion of the container secured therein is moved by the drawing means 11 from a mounting position upwardly in direction 25 after the container has been filled through opening 27. An electric motor means 29 drives the first rotatable clamping means 9 by means of a belt drive 31. An intermediate shaft 35 driven by belt drive 33 causes the second rotatable clamping means 23 to be synchronously driven with the first rotatable clamping means 9. The intermediate shaft 35 is connected via a belt drive 37 having a bearing 39 for clamping means 23. The second clamping means 23 is urged upwardly in direction 25 by spring 41. Clamping means 23 can be locked in a mounting position by a disengageable locking device 43. Locking device 43 is connected to and actuated automatically by control means 15. The line connection between the electromagnet 45, which is indicated only diagrammatically, and control means 15 is not shown. In operation, the locking means 43 is actuated to release the drawing means only after the heat-sealable area 3 has been heated to a high enough temperature to initiate the drawing operation. A viscosity break 47 is provided to control and retard the upward travel of the second rotatable clamping means during the drawing operation.

In FIG. 1, the bearing 39 for the clamping means 23 is mounted on arm 49 which can be swiveled about the axis of the intermediate shaft 35. A resilient retaining means 51 is used to prevent the rotation of arm 49. When the retaining means 51 is released, arm 49 can be swiveled away from the mounting region into a released position. In the released position, it is possible to fill the sample container 1 mounted in clamp 9. A stop 53 engages the locking device 43 to hold the arm 49 in the mounting position for container 1 as the arm 49 is swiveled. The resilient retaining means 51 is attached to the base plate 81 and comprises a stop spring engaging in slots recessed in the stop end 53 of the arm 49. The stop spring ensures engaging of the arm 49 over the entire upward travel of the second rotatable clamping means.

The rotatable clamping means 9 and 23 are designed to accommodate sample containers 1 having different dimensions. For this purpose, clamping means 9 has an adjusting screw 55 and the clamping means 23 has resiliently prestressed clamping jaws 57 and 59 which can be swiveled in the angular directions 61 or 63 as shown in FIG. 1. Clamping means 9 can be vertically adjusted vertically relative to clamping means 23 by rotating clamping means 9 on threaded shank 64. An adjustment screw 65 is provided to lock the clamping means 9 in one position on shank 9.

The heating means 5 may be positioned relative to the holder 9 and the container 1 to be heat-sealed. The heating means 5 is mounted in a guide 67 which is adjustable in direction 25. A clamping screw 69 is provided to lock the heating means 5 in a fixed position in guide 67.

The control means can be programmed for different operational sequences to accommodate the use of different types of sample containers. Two rotatable knobs 71 and 73 are provided for adjustment of the speed of the drive motor 29 and/or the period between the manual starting of control means 15 and the commencement of the drawing operation during which clamping means 23 elongates and seals heated container 1. A switch 75 is provided for initiating the program run.

The heating device 5 illustrated in FIG. 1 has a burner 77 for gaseous fuel, a burner flame which is focused on the heat-sealable area 3, and a fuel tank 79. The entire apparatus is mounted on base plate 81.

Figure 2:
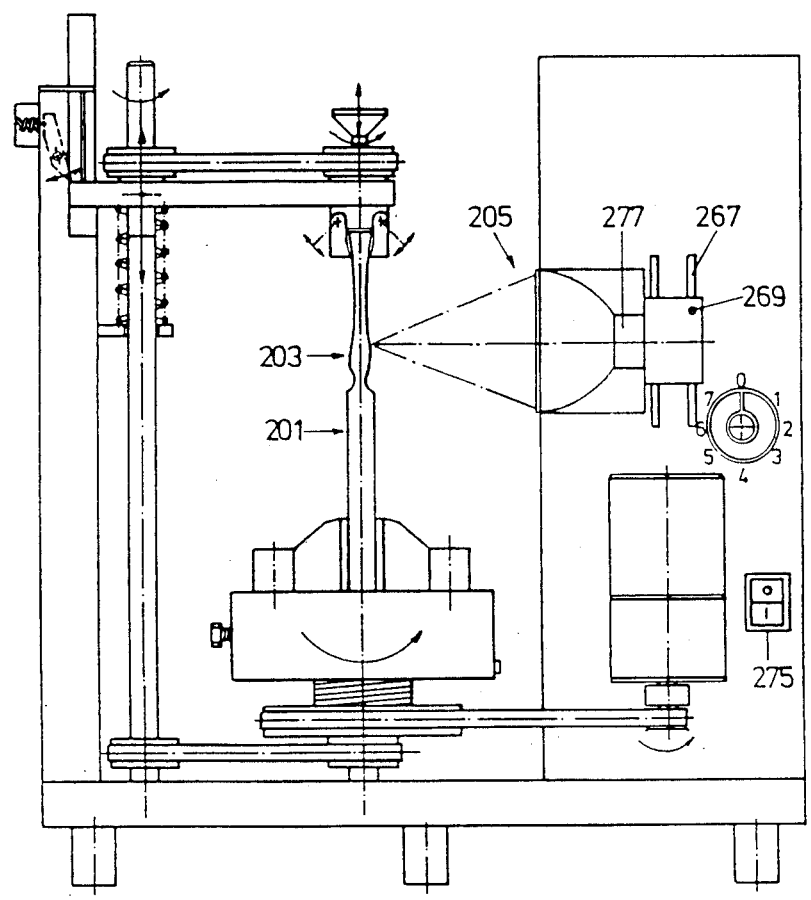
FIG. 2 is a side view of another embodiment which is similar to the apparatus shown in FIG. 1.

FIG. 2 shows another embodiment which corresponds in large part to the apparatus shown in FIG. 1, but differs in that the heating device 205 is an infrared lamp 277 which is focused on the heat-sealable zone 203. This apparatus is particularly suitable for use with sample containers 201 which have a neck portion 203 formed of a glass which absorbs radiation in the infrared region of the spectrum. Advantageously, the heat output of the infrared lamp can be more precisely controlled than the heat output of a gas burner and the use of such a lamp avoids the problem of venting exhaust gases produced by the flame.

Preferably, lamps are used herein which project onto the surface of the container to be sealed infrared radiation having a luminous intensity of from about 10 W/cm$^2$ to 1,000 W/cm$^2$.

Particularly suitable for use with the apparatus of FIG. 2 are sample containers having a heat-sealable area 203 formed of an infrared-absorbing glass having a relatively low melting point. When such glasses are used, a moderate heat output of the infrared lamp 277 is sufficient to hermetically seal the container. Infrared-absorbing glasses which have a heat-sealing temperature in the range of from about 950 to 1,000° C. are, for example, type 8516, manufactured by Schott Glaswerke, Mainz, Federal Republic of Germany. Such glasses comprise (in wt. %) $SiO_2$ 65–75 (70), $B_2O_3$ 0–3 (1), $Al_2O_3$ 1–5 (3.5), $Li_2O$ 0–2 (1), $Na_2O$ 5–12 (7.5), $K_2O$ 2–6 (4), $BaO$ 5–10 (7), $Fe_3O_4$ 2–5 (3–5), F 0–2 (0.5) and optionally a reducing agent. The values in parentheses indicate a preferred composition.

The type 8516 glass is particularly suitable because it has a heat-sealing temperature of approximately 985° C.

In operation, the glass sample is positioned in the apparatus and the switch 75 or 275 is actuated to initiate the automatic sealing of the container. When the apparatus in FIG. 1 is switched on, the gas burner 77 is ignited by an automatic igniter.

In the context of the present invention, infrared absorbance is defined as $$I_d = I_o \cdot e^{-k \cdot d}$$

$I_d$ = intensity after passing through the thickness of the glass whose absorption coefficient is k $I_o$ = original intensity e = Euler's constant (2.718 . . . )

k = infrared absorbance (absorption coefficient).

Preferably, the neck portion is sealed with a halogen infrared emission reflector No. 64635 manufactured by Osram, Berlin, Federal Republic of Germany. This lamp has the following characteristics: maximum intensity at 800 nm, wavelength region 500 to 2,000 nm, power 150 W, maximum temperature in the focal point 1,500° C.

From the foregoing description, one skilled in the art can easily ascertain the essential characteristics of this invention and, without departing from the spirit and scope thereof, can make various changes and modifications of the invention to adapt it to various usages and conditions.

We claim:

1. An apparatus suitable for heat-sealing a glass container formed about an axis of rotation, the glass container having an open top-end portion and a closed bottom-end portion, the apparatus comprising:
    a first clamping means into which the closed bottom-end portion of the container is selectively fixed in non-rotatable relation;
    first rotating means for rotating the first clamping means about the axis of rotation of the glass container when the glass container is mounted therein;
    a second clamping means axially aligned with the first clamping means and into which the open top-end portion of the container is selectively fixed in non-rotatable relational; wherein, both clamping means have axes of rotation aligned with the axis of rotation of the glass container;
    second rotating means for rotating the second clamping means about the axis of rotation of the glass container when the glass container is mounted therein;
    drive means connected to both the first and second rotating means for rotation of both clamping means with equal rotational speeds;
    pivotal means for pivoting one of the clamping means about a second axis, not common with the axis of rotation, allowing the glass container to be handled freely;
    drawing means for moving one of said clamping means in the direction along the axis of rotation away from the other clamping means, the drive means is, while at a selected rate, rotating both clamping means at equal rotational speeds;
    means associated with the drawing means, for controlling the rate at which the drawing means moves one clamping means away from the other clamping means, and
    heating means for focusing energy on and thereby raising the temperature of the open top-end portion of the container.

2. The apparatus of claim 1, further including control means programmed to control the rotation of the first and second clamping means and the heating means.

3. The apparatus of claim 2, further including a locking means engageable with the drawing means, for restraining the movement of the second clamping means in the direction of the axis.

4. The apparatus of claim 3, wherein the control means causes the locking means to release the drawing means.

5. The apparatus of claim 1 further including motor means connected to the drive means for effecting rotation of the first and second clamping means.

6. The apparatus of claim 1, wherein the heating means is an infrared lamp.

7. The apparatus of claim 1, wherein the heating means is a gas burner.

8. The apparatus of claim 1, wherein the drive means includes a rotatable shaft extending parallel to the rotational axis of the clamping means and mounted in spaced relation thereto, the drive means further including means for rotatably connecting both of said clamping means to said rotatable shaft so as to rotate together.

9. The apparatus of claim 8, wherein the pivotal means comprises a pivotal arm having first and second ends, which pivotal arm is pivotally mounted adjacent said first end on said rotatable shaft, said second rotatable clamping means being mounted on the second end of the arm, the apparatus further including resilient retaining means for selectively preventing pivoting of said pivotal arm when said rotational axes of clamping means are aligned.

* * * * *